US007583178B2

(12) United States Patent
Hougen et al.

(10) Patent No.: US 7,583,178 B2
(45) Date of Patent: Sep. 1, 2009

(54) SYSTEM AND METHOD FOR RFID READER OPERATION

(75) Inventors: Robert W. Hougen, Eugene, OR (US);
Patrick S. Watkins, Eugene, OR (US);
Kurt E. Steinke, Springfield, OR (US);
Mark R. Cohen, Elmira, OR (US)

(73) Assignee: Datalogic Mobile, Inc., Eugene, OR (US)

( * ) Notice: Subject to any disclaimer, the term of this patent is extended or adjusted under 35 U.S.C. 154(b) by 503 days.

(21) Appl. No.: 11/084,072

(22) Filed: Mar. 16, 2005

(65) Prior Publication Data

US 2006/0208859 A1 Sep. 21, 2006

(51) Int. Cl.
*H04Q 5/22* (2006.01)
(52) U.S. Cl. .................... 340/10.1; 340/10.3; 345/903; 345/204; 345/205
(58) Field of Classification Search ............... 340/10.1, 340/10.3; 345/903, 204, 205
See application file for complete search history.

(56) References Cited

U.S. PATENT DOCUMENTS

| 5,640,002 | A | 6/1997 | Ruppert et al. ............... 235/472 |
| 5,659,167 | A | 8/1997 | Wang et al. .................. 235/472 |
| 6,170,748 | B1 | 1/2001 | Hash et al. .................. 235/451 |
| 6,292,525 | B1 * | 9/2001 | Tam ............................... 378/4 |
| 6,318,636 | B1 | 11/2001 | Reynolds et al. ........ 235/472.01 |
| 6,456,239 | B1 | 9/2002 | Werb et al. .................. 342/463 |
| 6,607,134 | B1 | 8/2003 | Bard et al. ............. 235/472.01 |
| 6,687,460 | B2 * | 2/2004 | Muller ........................ 396/534 |
| 6,745,027 | B2 | 6/2004 | Twitchell, Jr. ............. 455/422.1 |
| 6,758,403 | B1 | 7/2004 | Keys et al. ............. 235/462.45 |
| 6,895,196 | B2 * | 5/2005 | Uchizono et al. ............. 399/75 |
| 7,042,358 | B2 | 5/2006 | Moore ..................... 340/572.1 |
| 7,063,256 | B2 * | 6/2006 | Anderson et al. ............ 235/385 |
| 7,117,374 | B2 * | 10/2006 | Hill et al. .................... 713/193 |
| 7,195,169 | B2 | 3/2007 | Bhatia et al. ........... 235/472.01 |
| 7,199,716 | B2 | 4/2007 | Shanks et al. ............. 340/572.1 |
| 7,221,668 | B2 | 5/2007 | Twitchell, Jr. ............... 370/338 |
| 7,243,849 | B2 | 7/2007 | Lapstun et al. ......... 235/462.45 |
| 2001/0008390 | A1 * | 7/2001 | Berquist et al. .......... 340/10.31 |
| 2002/0072395 | A1 * | 6/2002 | Miramontes ................ 455/566 |
| 2004/0076232 | A1 * | 4/2004 | Akiyama et al. ....... 375/240.08 |
| 2004/0105024 | A1 * | 6/2004 | Takahashi .............. 348/333.01 |
| 2004/0118916 | A1 | 6/2004 | He .............................. 235/383 |
| 2004/0217774 | A1 * | 11/2004 | Choe ........................... 326/30 |
| 2005/0212676 | A1 * | 9/2005 | Steinberg ................ 340/572.8 |

(Continued)

OTHER PUBLICATIONS

Falcon®4420 RFID user manual (Addendum) R44-2494 (Rev. X1) PSC Inc. (no date)³.

(Continued)

*Primary Examiner*—Brian A Zimmerman
*Assistant Examiner*—Yong Hang Jiang
(74) *Attorney, Agent, or Firm*—Stoel Rives LLP

(57) ABSTRACT

A system and method for providing operational feedback of systems employing electronic tags such as radio frequency identification (RFID) tags. In one configuration, the RFID reader is actuated by a single trigger pull, with the reader continuing to read multiple RFID tags in the read zone as long as the trigger is held until a terminating event occurs and in another configuration, an apparatus and method provides real-time feedback of the progress of a multiple RFID tag reading operation.

23 Claims, 6 Drawing Sheets

U.S. PATENT DOCUMENTS

| | | | |
|---|---|---|---|
| 2006/0208890 A1 | 9/2006 | Ehrman et al. | 340/572.1 |
| 2007/0063817 A1 | 3/2007 | Cherry | 340/505 |
| 2007/0095911 A1 | 5/2007 | Shimura et al. | 235/440 |

OTHER PUBLICATIONS

Falcon®5500 RFID Mobile Hybrid Computer user manual (Addendum) R44-2494 (Rev. X3) PSC Inc. (no date)[3].

Falcon®5500 RFID Mobile Hybrid Computer user manual (Addendum) R44-2494 (Rev. X4) PSC Inc. (no date)[3].

Falcon®5500 RFID Mobile Hybrid Computer user manual (Addendum) R44-2494 (Rev. A) PSC Inc. (about Aug. 2006)[3].

U.S. Appl. No. 11/230,365, filed Sep. 19, 2005 to Craig Cherry, entitled "Method and System For Inventory Monitoring.".

Office Action dated Jul. 24, 2007, for U.S. Appl. No. 11/230,365, filed Sep. 19, 2005 of Craig D. Cherry (application published as US2007/0063817).

* cited by examiner

US 7,583,178 B2

SYSTEM AND METHOD FOR RFID READER OPERATION

RELATED APPLICATION DATA none

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71.

BACKGROUND

The field of the present disclosure relates to operating methods and techniques for systems employing electronic identification tags such as radio frequency identification (RFID) tags. In particular, methods and apparatus are described herein for improving and facilitating operation of electronic tag and RFID reading systems.

RFID technology uses electromagnetic energy as a medium through which to send information. Typically, RFID tags are affixed to various articles for allowing identification of items in a sales transaction or tracking movement of the articles through a business location. In a typical RFID tag system, a receiver and some type of transmitter, an antenna, and memory are implemented. Through the use of these components, RFID tags are enabled to receive, store, and transmit article-identifying data to/from a remote data base station without the manual handling operations as is required in most bar code systems. RFID tags may be read-only or read-write. Passive RFID tags may be implemented without batteries and draw their power from the radio frequency (RF) energy transmitted from the reader. RFID tags may be low or high frequency depending on the application.

The present inventors have recognized the desirability of providing feedback on the operation of RFID reading systems for improving operational efficiency and performance.

SUMMARY

The present invention is directed to operation and feedback of systems employing electronic tags such as radio frequency identification (RFID) tags. In one embodiment, the RFID reader is actuated by a single trigger pull, with the reader continuing to read multiple RFID tags in the read zone as long as the trigger is held until a terminating event occurs. In another embodiment, an apparatus and method provides real-time feedback of the progress of a multiple RFID tag reading operation.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments will now be described with reference to the drawings. For the purposes of the present disclosure, certain of the descriptions will be described with respect to an RFID reader reading RFID tags, but the disclosure may also be applicable to other electronic tags systems such as combined RFID/EAS tag systems or other wireless electronic tag systems, and combined RFID and optical code readers. The disclosure may also apply to a system such as disclosed in U.S. application Ser. No. 09/597,340 hereby incorporated by reference wherein an EAS or RFID tag circuit or enabler circuit is integrated into the circuitry of the electronic item itself.

Figure 1:
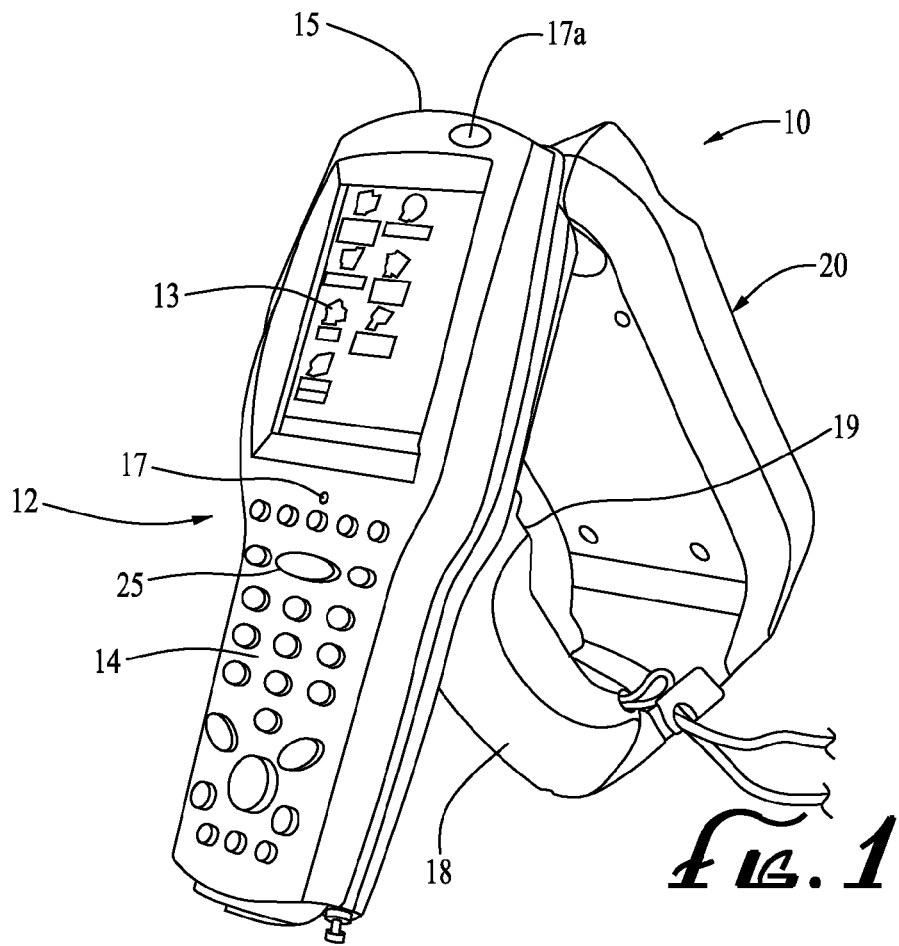
FIG. 1 is a diagrammatic view of a combined RFID system comprised of an RFID reader, optical code reader and data terminal according to a preferred embodiment.

FIG. 1 illustrates a handheld combination device 10 comprising a portable terminal section 12, a handle section 18 and an RFID antenna section 20. The portable terminal section 12 includes a display screen 13 and a keypad section 14 for providing control or data input into the terminal, as well as displaying information to the user. The terminal 12 includes a front window 15 through which a data reading device such as an imaging reader or laser scanner is operative to read optical codes or otherwise to detect an image within a field of view. The reader 10 is preferably a combination system with the various functions controlled by the terminal 12 as selected by the user via input using the touch display screen 13 or the keypad section 14. Within a particular mode of operation, the user may activate a particular read operation by actuating the trigger 19 located on the front of the handle 18 or a scan key trigger 25 on the keyboard 14, or another virtual switch on the touch screen 13.

During a read operation in response to a trigger pull, the reader sends out an interrogation signal. Upon receipt of the interrogation signal, an RFID tag (whether it is a passive tag or an active tag) may respond by sending out a return signal containing the tag data/information. The RFID reader then senses the return signal and processes the signal to obtain the data.

An RFID read operation in a handheld device is typically defined by a trigger pull and a single read command sent to the reader to read all tags within the RF field. As such, an RFID reader may read multiple tags within a single read operation or tag inventory operation. Typically, each of the tags seen in a given read operation is read sequentially according to a suitable protocol such as query response protocol or air interface protocol (AIP).

The present inventors have determined that all tags in a read volume are not always successfully read during a single read operation. In a first preferred embodiment, the RFID read operation is extended beyond a single read attempt by continuing to perform multiple reads, that is, multiple interrogation sequences are undertaken out until a terminating criteria has been met. One such method may be directed to a handheld reader including the steps of (1) pointing a handheld RFID reader toward a read area; (2) actuating a trigger on the handheld RFID reader to commence reading RFID tags by the substeps of (a) performing a first read operation, wherein the read operation comprises interrogating and sensing one or more RFID tags in the read area, (b) continuing with a subsequent read operation comprising reading one or more tags in the read area which may be different tags than the tags read during the first read operation, and (c) the RFID reader discontinuing subsequent read operations once a termination criteria is met. And if the reader is moved as between the first read operation and the second read operation, the read area or direction of read may also be changed.

There are various mechanisms and methods the terminating criteria. Such a terminating criteria may comprise any one or more of the following:

1. Releasing of the trigger: in one configuration the operator would hold the trigger and the reading operation would continue as long as the trigger is held. In such a method, the operator need not release and re-actuate the trigger in order to affect continued read operations.

2. A second trigger pull: in this methodology the user would actuate read operation by a first trigger pull and release the trigger and the read operation would continue until a subsequent (second) trigger pull notifying the system to terminate.

3. Software decision, wherein several embodiments are envisioned:

A. Use of a counting mechanism—in one method the system would have knowledge that a discrete number of RFID tags are expected in a particular read operation. For example, when reading a pallet of items in a warehouse, the system might know that 50 items (i.e., 50 RFID tags to be read) are expected to be located on the pallet and once each of the 50 RFID tags are read, operation is terminated. In a subset of this section, the pallet itself may include its own RFID tag with the RFID tag itself including information as to how many items are included on the pallet. Alternately the information may be stored in a look-up table accessible to the reader terminal. Once the RFID tag on the pallet is read, the terminal can access the lookup table and obtain the number of RFID tags that are expected to be on the pallet.

B. Input field filling: the RFID data being collected may be used to fill out certain input fields such as on an inventory check list. Once all the input fields on the inventory check list are filled, the read operation may be terminated.

C. External controller: The read operation may be monitored via network and RFID read data may be reported to the host via the network where it is analyzed and a terminating signal may then originate from the host via the network.

D. Termination delay timer: the reader may have delay in termination after the trigger is released.

E. New tag read timer: the reader may automatically continue to read and analyze whether new tags have been read. A timeout timer restarts each time a new tag is detected. As long as a new tag is detected, it would be desirable to continue searching for and reading additional tags. If a new tag is not read within a given time, such as 10 seconds, read operation is terminated.

F. Minimum Tag Count: the minimum number of tags to attempt to read during the inventory operation.

Each of the timeout times, shut off delay, or other system variables may be programmable variables that may be selected by the user, defaults in the system, selected by the host computer over the network, or may be actively varied by the system as selected by given criteria due to prior to read operations or other inputs.

This operating scheme allows the operator to move the reader in a single operation to read all the tags such as on a shelf or on a product pallet. By being able to move the reader during the tag inventory operation, the operator can relocate the direction of the antenna so as to better locate and read RFID tags at different positions and orientations. For example, if the items on the pallet contain water or metal, then the RFID tags located on an opposite side of the pallet from the reader are difficult to read because the water or metal tends to absorb the electromagnetic fields. By moving around to an opposite side of the pallet, the operator can reorient the reading of the RFID tag so that the RF signal need not pass through the water/metal. In the shelf example, the shelf may be too wide (or there may be multiple shelves) to enable the reader to read all the items on the shelf from a single position. The operator may activate the reader, holding the trigger, and moving the reader in a sweeping motion along the shelf, or each one of a plurality of shelves) so as to read each item on the shelf.

Preferably the RFID tag data is reported as it is read and becomes available prior to the end of the overall read operation. In one embodiment, the reader responds with an audible beep tone each time a new RFID tag is read and reported. Preferably duplicate tag reads are removed by a suitable method. The user may also be notified by actuation of an LED 17 such as by flashing green each time a new tag is read. The repetitive beeps and/or lighting of the LED indicator 17 provide information to the operator of the progress of the read operation. For example, where there are multiple tags intended to be read during the operation, the plurality of tags are read quickly at the beginning of the operation, but as more and more of the tags are read, fewer tags remain to be read and thus the frequency of the beeps indicating new tags being read slows down eventually notifying the operator that there are no further tags to be read when a beep has not been heard within a reasonable time frame. The operator then terminates the operation by releasing the trigger. This trigger holding operation enables the operator to move the read field such as walking around a pallet or painting a field systematically moving the reader across a shelf of items to provide the reader with the opportunity to read each of the items from an optimal orientation.

In other termination criteria, software application could examine an intermediate report of tag data received and, following a given criteria, decide to terminate read operation. One such criteria may comprise searching for a specific tagged item from amongst many items in a read area.

Duplicate tag data may also be removed by keeping track of what tags have already been read, comparing a new tag read to the list of tags already read and not reporting a duplicate tag if determined that the tag had already been written.

By reporting tag data prior to the end of the read operation, an application at a higher level looking at the results may allow the software to analyze the data and potentially control continuing read operation.

Figure 2:
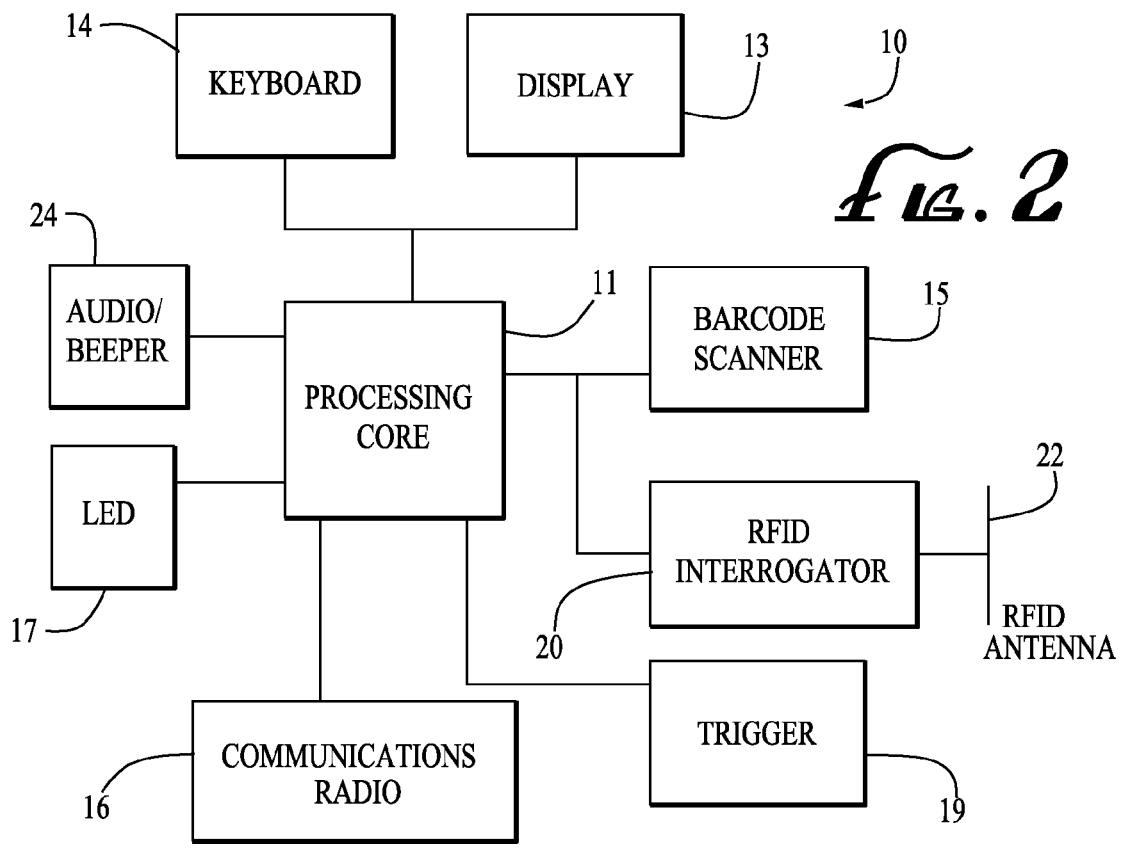
FIG. 2 is a simplified block diagram of an RFID system of FIG. 1.

FIG. 2 illustrates a schematic of the components of the combined reader 10 of FIG. 1. The reader 10 includes a processing core 11 which may comprise the microprocessor within the terminal 12. Connected to the processor core 11 are the keyboard 14 that provides for information input and the display 13 which displays information and also acts as a touch screen for inputting commands or data into the system. Under the control of the processing core 11 the system includes two indicators audio/beeper 24 and an indicator light 17. The indicator may comprise a light-emitting diode (LED) or other suitable visible light indicator. Alternately, the indicator may be a separate high-intensity LED 17a on the top of the housing (as shown in FIG. 1) or may be a suitable indicator appearing on the display 13, or by additional electro-mechanical means.

The reader 10 has multiple data input devices, namely a barcode scanner or imaging reader 15 and an RFID interrogator 20. Attached to the interrogator is the RFID antenna 22. The system communicates to a computer or another host via communications 16 which is preferably wireless connection.

The display 13 provides a versatile and convenient control interface for the system 10. In a preferred operation, the user may select which of the reading mechanisms to be used. In preferred configuration, the system 10 includes two triggers, namely the pistol trigger 19 on the handle 18 and the scan key trigger 25 on the keyboard 14 of the terminal 12. Additional triggers may provide by other keys on the keyboard 14, by "virtual" key/triggers displayed on the touch screen 13, or by additional electro-mechanical means.

Figure 3:
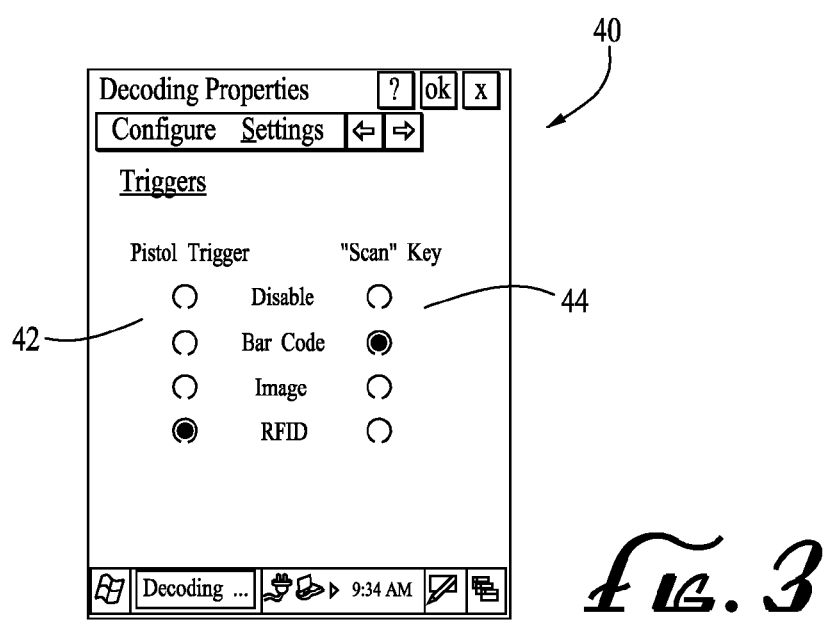
FIG. 3 is a screen shot for an input scheme of a program for the system of FIG. 1.

In one operating scheme, the terminal operates in a Microsoft Windows™ environment. Once the unit is powered on, onscreen instructions are used to calibrate the touch screen 13. Accessing the configuration settings, a set of trigger options are accessed in the display 40 shown in FIG. 3. Using this screen, the pistol trigger may be enabled or disabled and the data reading device selected which would be operable by the pistol trigger in this setting. For example in the settings of buttons 42 as shown in FIG. 3, the RFID reader is selected to be actuated by the pistol trigger 19 and the barcode scanner is set to be actuated by the scan key 25 by the buttons 44. Alternately, where the unit 10 includes an imaging reader or imaging system, such could be activated by a given trigger (element 19 or element 25) as selected in this onscreen selection process.

Once the system 10 has been enabled to read RFID tags, an application is opened on the terminal 12 that accepts data in a suitable format as received from RFID tags such as, for example, keyboard wedge data which is accepted by Microsoft Wordpad™ program. Once the program is activated, RFID tags may be read by the steps of:

(1) Aiming the device toward the tag desired to be read.
(2) Pressing the trigger 19, the front LED 17 turns orange indicating that the RFID reader 20 is in operation.
(3) The device sounds an audible beep as tags are read.
(4) The RFID read is entered into the application.
(5) When the read is finished, the LED 17 is turned off and a final beep is sounded indicating that the read operation is complete.

Figure 4:
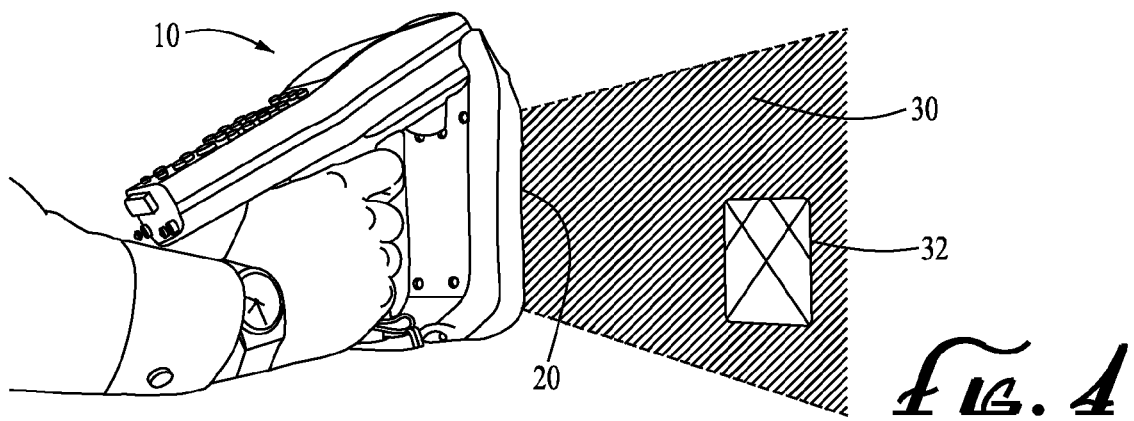
FIG. 4 is a diagram of an RFID system illustrating an RFID reading field relative to an RFID tag.

FIG. 4 illustrates a preferred orientation for aiming the reader 10 and an RFID tag 32 such that the RFID section 20 points directly at the tag 32 providing a read field 30 encompassing the tag.

Figure 5:
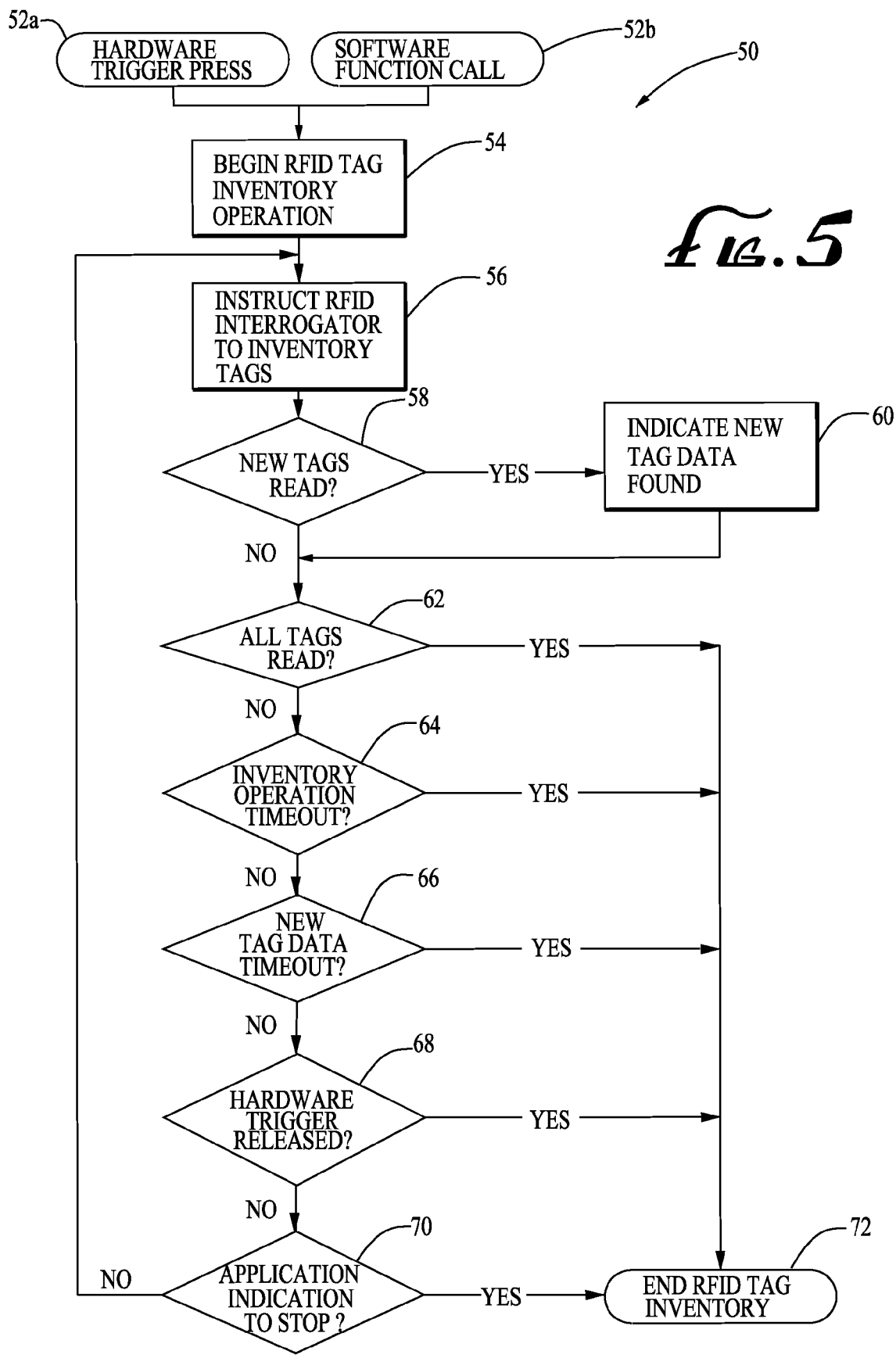
FIG. 5 is flow chart of a method of RFID feedback operation according to a preferred embodiment.

FIG. 5 is a flow chart of a preferred method 50 as described in the following steps.

System start either via a hardware trigger pull at Step 52A or via a signal from an operating/software protocol at Step 52B.

Commencing RFID tag inventory operation at Step 54.

Instructing the RFID interrogator to inventory tags at Step 56. In this step, the RFID interrogator emits a signal instructing RFID tags to transmit their data. The interrogator then receives the signals from the tags.

Determining at Step 58 whether any new tags have been read; if "No" continue scanning at step 62 and if "Yes" proceed to step 60. At this Step 58, the system compares a tag read to a list of tags previously read and only register a new read when the tag read has not been previously indicated during the current inventory.

Indicating a new tag has been read at Step 60. This indication may be actuating an audible tone at beeper 24 and/or actuating the LED 17 (or 17a) to provide a visual indicator.

Step 62 (read termination) determining whether all the tags have been read. There are several methods by which this condition may be determined. Starting timer at step 56.

Step 64 (read termination) determining whether an operation timeout has occurred. This timer is started at Step 54 or 56 and runs continuously as tags are read. This timeout may be programmable and set to a value depending on system requirements or may be a variable adjusted by the system depending upon certain read criteria such as average RFID signal strength detected (for example, if the signal strength is low, then a longer timeout is set).

Step 66 (read termination) determining whether a new tag timeout has occurred. This timer is re-started each at Step 60 each time a new tag is detected as being read. As long as new tags are being read, it is desired to permit the reader to continue reading tags. This timeout may also be programmable and set to a value depending on system requirements or may be a variable adjusted by the system depending upon certain read criteria such as average RFID signal strength detected (for example, if the signal strength is low, then a longer timeout is set).

Step 68 (read termination) determining if the trigger has been released.

At step 70 if no read termination has been indicated, returning to Step 56 and continue tag inventory.

At Step 72, if a read termination has been indicated, ending RFID tag inventory.

The method of FIG. 5 includes multiple termination events 62, 64, 66, 68, 70. The order of these events may be re-arranged, or one or more of the steps may be omitted depending on the application. Which of these termination steps (or combination of steps) is applied may be user-selected via a suitable program interface. For example, the system may terminate the read only via release of the trigger of Step 68 with Steps 62, 64, 66, 70 omitted.

Figure 6:
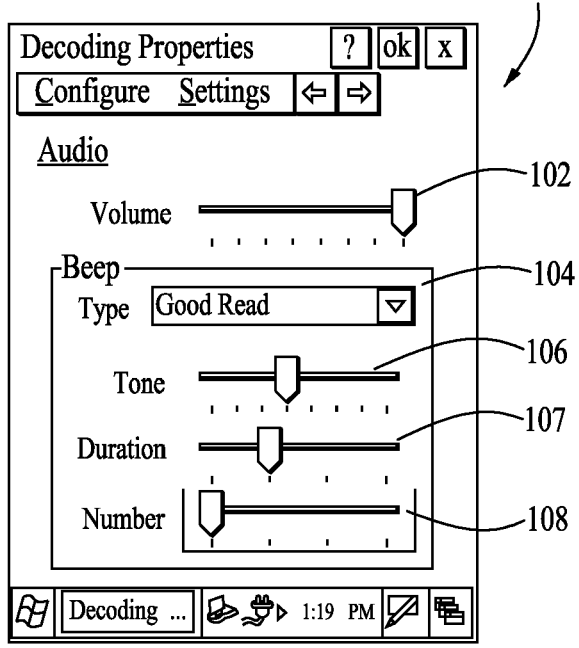
FIG. 6 is a screen shot for an input scheme of an audio portion for the system of FIG. 1.

FIG. 6 is a screen shot 100 of display 13 illustrating an input scheme for selecting the audio indicators. A volume slide button 102 enables the user to select a "beep" volume from zero to a maximum. There are several audible indicators in the system, and each of these indicators is adjustable, being selected by the drop-down menu 104. The "Good Read" type is shown, the others may include "All Tags Read" type (as from Step 62). Once a type 104 is selected, the tone may be selected by slide button 107, the "beep" duration may be selected by slide button 108, and the number of "beeps" may be selected by slide button 108. For example, a triple beep may be sounded to indicated that all tags have been read.

Figure 7:
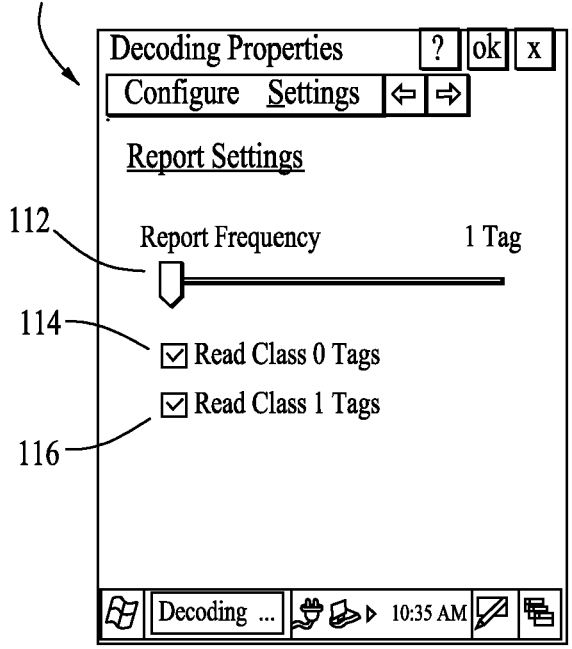
FIG. 7 is a screen shot for an input scheme of report settings for the system of FIG. 1.

FIG. 7 is a screen shot 110 of display 13 illustrating an input scheme for report settings. Slide button 112 selects how often RFID tag data is reported to an application. When set to a specific number of tags, data is reported when at least the selected number of new tags have been read. When set to the minimum (i.e. one tag) each time a new tag is read, the tag is reported, that is every new tag is reported once read. When set to Infinite, data is only reported when a painting operation is complete. Selecting the checkbox 114 for Read Class 0 Tags or checkbox 116 for Read Class 1 Tags selectively enables or disables the device to read each class of RFID tags. Improved performance may be achieved by enabling only the class of tags which will be used, if known.

Figure 8:
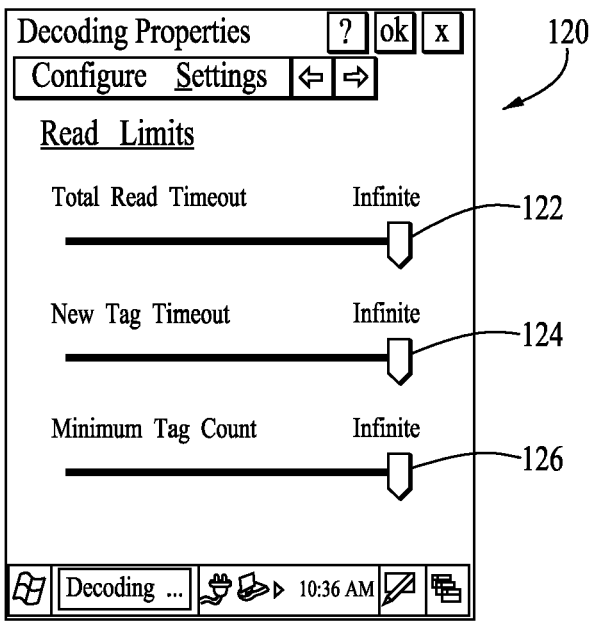
FIG. 8 is a screen shot for an input scheme of read limits for the system of FIG. 1.

FIG. 8 is a screen shot 120 of display 13 illustrating an input scheme for selecting read limit values:

Total Read Timeout 122: the time for which the reader will be allowed to read before terminating the operation. This value corresponds to Step 64 above. If set to Infinite, then the reading/searching for new tags will continue until trigger is released, New Tag Timeout occurs, or the minimum number of tags has been read.

New Tag Timeout 124: the amount of time to wait between new tag reads before the inventory operation is terminated. This value corresponds to Step 66 above, the maximum amount of time spent waiting for a new tag to be read after the last new tag that had previously been read. If set to Infinite, then the reading/searching for new tags will continue until the trigger is released, Total Read Timeout occurs, or the minimum number of tags has been read.

Minimum Tag Count 126: the minimum number of tags to attempt to read. If set to Infinite, then the reading/searching for new tags will continue until trigger is released or one of the timeout conditions is met.

To improve operability during an inventory reading process, additional feedback may be provided to the operator. Audible indicators such as a "beep" tone at a given pitch may signal the successful read of an RFID tag. As in the above-described embodiment, a signal is preferably sounded only when a new tag is read. Once all the tags are determined to have been read, then an alternate signal may be sounded, such as a second beep tone of a different pitch, or a multiple beep tone, to provide a signal to the operator that the reading operation is complete.

The display 13 may also provide feedback during the inventory reading process such as:

1. A quantity of tags read during the operation—various formats of display may implemented such as: (a) a simple increasing number in the form of the numerical representation (e.g. 1, 2, 3 . . . 50), or (b) a bar graph with either a single bar or multiple bars.

2. A countdown of the number of items to be read. In this example, the expected number of items to be read within an inventory read operation is known or obtained. Then the display screen 13 shows the beginning number of items expected (e.g. 50) counting down toward zero (e.g. 50, 49, 48 . . . 3, 2, 1, 0).

3. A display of the amount of operation time remaining. The display may show a numeric countdown (counting down toward zero, e.g. 10, 9, 8, 7, 6, 5, 4. 3, 2, 1, 0), or a graphical representation such as an hourglass with decreasing amounts of material at the top of the hourglass as the remaining time decreases. The countdown amount may be from Total Read Timeout 122 or New Tag Timeout 124.

Figure 9:
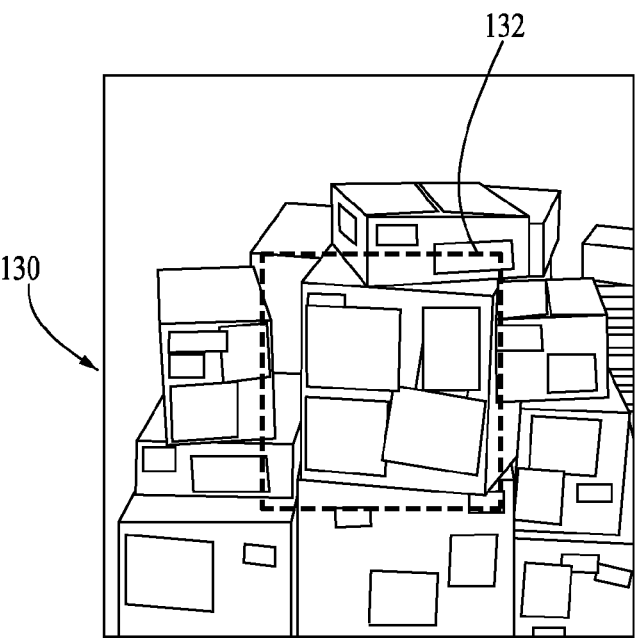
FIG. 9 illustrates the data terminal of FIG. 1 with a detailed view of a screen shot for a display illustrating a image of a field of view with a preferred RFID read zone interposed thereon.
Figure 9:
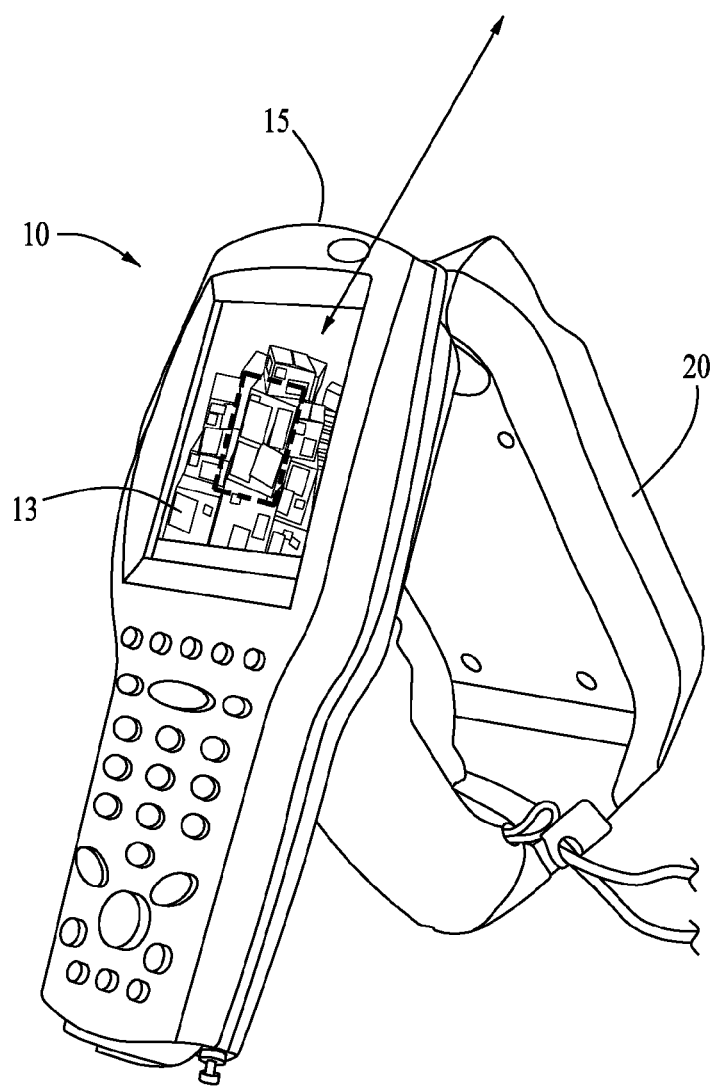

The ability to read a specific electronic tag may be affected by the proximity of the tag to the reader, direction, and interposition of objects therebetween. FIG. 9 illustrates an alternate embodiment in which the unit 10 is provided with an imager 15 and an image display. In this embodiment, the operator may select an operational mode whereby an image 130 of the field of view of the RFID reader is acquired by the imager 15 and displayed on the display screen 13. The image 130 may be larger than the effective read zone of the RFID reader 20, but the display screen 13 may further provide feedback of the effective read region such as an outline of the effective read zone (shown by dashed lines 132). The dashed lines 132 may thus comprise a targeting pattern indicative of an effective read area of the reader 20. Thus, a preferred method of electronic tag reading may comprise the steps of: passing a handheld electronic tag reader 10/20 past a read area; providing the electronic reader 10 with a display screen 13; displaying an image 130 of a field of view of the electronic tag reader on the display screen 13; displaying a targeting pattern 132 onto the image 130 of the field of view on the display screen 13 indicative of an effective read area of the electronic reader.

Figure 10:
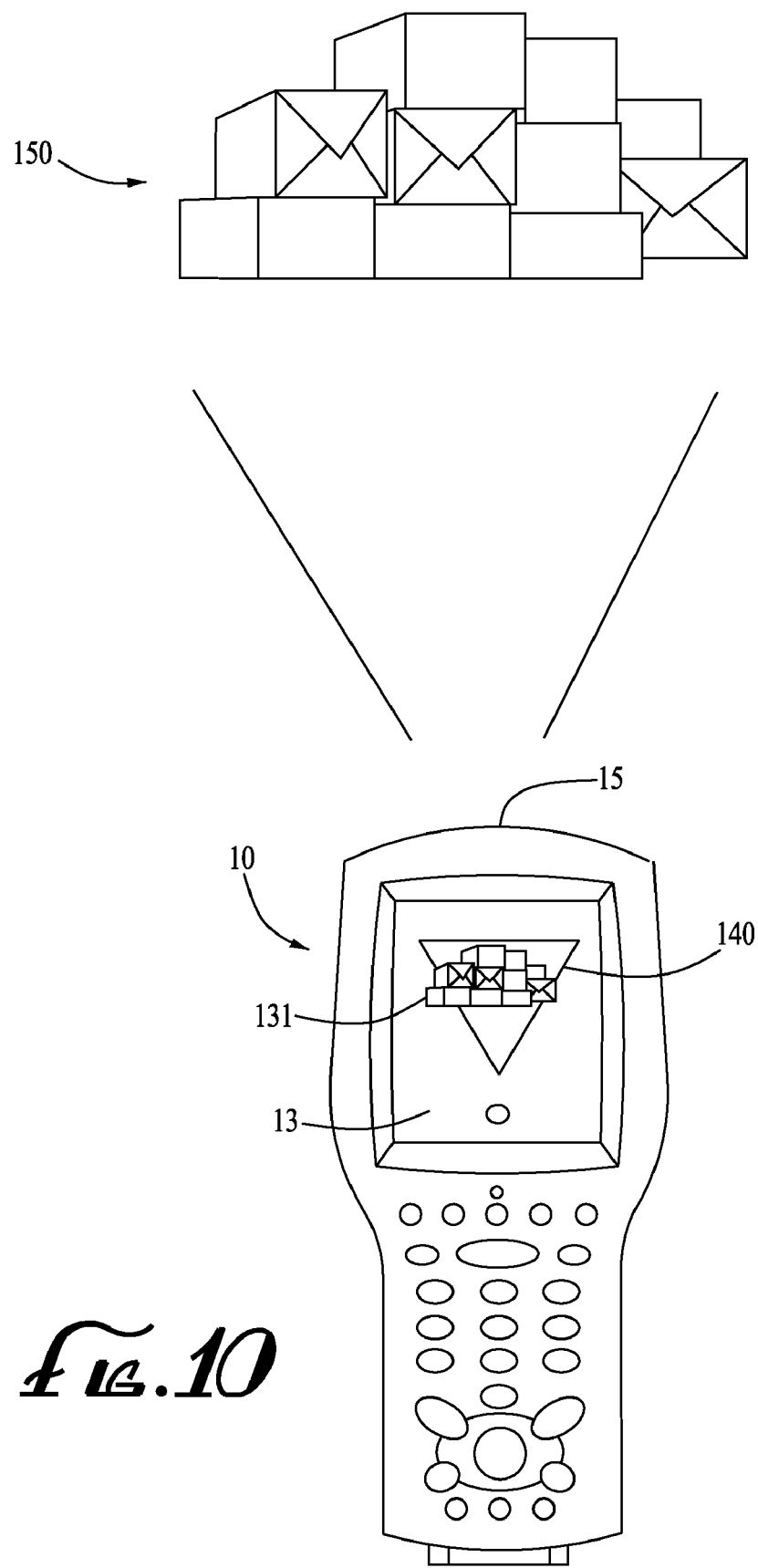
FIG. 10 illustrates a data terminal as in FIG. 9 with an alternate targeting format.

FIG. 10 illustrates another alternate embodiment similar to the embodiment of FIG. 9. FIG. 10, the unit 10 is also provided with an imager and an image display. The imager can acquire an image of an item in the field of view, in this instance the item comprises a plurality of boxes 150. The operator may select an operational mode whereby an image 131 of the field of view of the reader is acquired by the imager 15 and displayed on the display screen 13. The image 131 may be larger than the effective read zone of the RFID reader 20, but the display screen 13 may further provide feedback of the effective read region such as a shaded region 140. The region 140 may comprise a unique color such as red and is preferably sufficiently transparent such that the item 150 is visible therethrough. The region 140 may comprise a targeting pattern indicative of an effective read area of the reader 20. The region 140 may be any suitable shape, the triangular shape illustrated in the figure being just an example.

Thus the present invention has been set forth in the form of its preferred embodiments. It is nevertheless intended that modifications to the disclosed methods and systems may be made by those skilled in the art without altering the inventive concepts set forth herein. The scope of the present invention should, therefore, be determined only by the following claims.

The invention claimed is:

1. A method of electronic tag reading comprising the steps of:
    passing a handheld electronic tag reader past a read area;
    providing the electronic reader with a display screen;
    displaying an image of a field of view of the electronic tag reader on the display screen;
    displaying a targeting pattern onto the image of the field of view on the display screen indicative of an effective read area of the electronic reader.

2. A method of electronic tag reading comprising the steps of:
    pointing a handheld electronic tag reader toward a read area;
    acquiring an image of a field of view of the electronic tag reader;
    displaying the image of the field of view on a display screen, the display screen being disposed on the electronic tag reader;
    displaying a targeting pattern on the display screen indicative of an effective read area of the electronic tag reader.

3. A method according to claim 2 wherein the targeting pattern comprises a shaped outline of the effective read area superimposed over the image of the field of view.

4. A method according to claim 2 wherein the targeting pattern comprises a rectangular or triangular outline of the effective read area superimposed on the image of the field of view on the display.

5. A method according to claim 2 wherein the targeting pattern comprises a shaded region.

6. A method according to claim 5 wherein the shaded region is sufficiently transparent such that an object being displayed is visible through the shaded region.

7. A method according to claim 2 further comprising permitting the operator to select an operating mode to activate the display screen to display the image of the field of view.

8. A method according to claim 2 further comprising actuating a trigger on the electronic tag reader a first time to commence reading electronic tags by the steps of
performing a first read operation, wherein the read operation comprises interrogating and sensing one or more electronic tags in the read area,
continuing with a subsequent read operation comprising interrogating and reading one or more electronic tags in the read area,
the electronic tag reader discontinuing subsequent read operations once a termination criteria is met.

9. A method according to claim 8 further comprising repeating subsequent read operation as long as the trigger is held, wherein the termination criteria is met by releasing the trigger.

10. A method according to claim 9 wherein upon releasing the trigger, continuing to read additional electronic tags for a given time period after trigger release.

11. A method according to claim 8 wherein the termination criteria is met by
resetting and restarting a timeout timer when a new electronic tag is read,
discontinuing subsequent read operations if the timeout timer expires before a new electronic tag is read.

12. A method according to claim 8 wherein the termination criteria is met by counting a total number of distinct electronic tags read during a read operation and discontinuing subsequent read operation if the total number reaches a given value.

13. A method according to claim 8 wherein the termination criteria is met by completing input of field filling data.

14. A method according to claim 8 wherein the termination criteria is met by actuating the trigger a second time.

15. A method according to claim 2 wherein the read area contains multiple electronic tags, the method further comprising;
activating the electronic tag reader;
reading a plurality of the electronic tags within a single reader activation;
notifying the operator of reading operation by sounding an audible signal each time a non-previously read electronic tag is read.

16. A method according to claim 15 further comprising discontinuing subsequent read operations once a termination criteria is met, wherein the step of activating the reader comprises actuating a trigger on the reader and wherein the termination criteria is met by releasing the trigger.

17. A method according to claim 2 further comprising
initiating a tag inventory operation;
attempting to read an electronic tag within the read area;
if an electronic tag has been read and data from the electronic tag has been obtained, transmitting the data retrieved to a host without terminating reading operations.

18. An electronic tag reader for reading electronic tags disposed in a read area, comprising
a housing adapted for handheld operation;
an imager for acquiring an image of a field of view of the electronic tag reader;
a display screen disposed on the housing visible to an operator, the display screen operative to display the image of the field of view,
wherein the display screen is adapted to display a targeting pattern on the image of the field of view, the targeting pattern being indicative of an effective read area of the electronic tag reader.

19. An electronic tag reader according to claim 18 wherein the targeting pattern comprises an outline of an effective read area superimposed on the image of the field of view.

20. An electronic tag reader according to claim 18 wherein the targeting pattern comprises a geometric outline of an effective read area superimposed over the image of the field of view.

21. An electronic tag reader according to claim 18 wherein the targeting pattern comprises a shaded region.

22. An electronic tag reader according to claim 21 wherein the shaded region is sufficiently transparent such that an object being displayed is visible through the shaded region.

23. An electronic tag reader according to claim 18 wherein the electronic tag reader is operative to switch to an operating mode whereby the display screen is activated to display the image of the field of view.

* * * * *

UNITED STATES PATENT AND TRADEMARK OFFICE
CERTIFICATE OF CORRECTION

| | | |
|---|---|---|
| PATENT NO. | : 7,583,178 B2 | Page 1 of 1 |
| APPLICATION NO. | : 11/084072 | |
| DATED | : September 1, 2009 | |
| INVENTOR(S) | : Hougen et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 503 days Delete the phrase "by 503 days" and insert -- by 964 days --

Signed and Sealed this

Thirteenth Day of April, 2010

David J. Kappos
*Director of the United States Patent and Trademark Office*